(12) United States Patent
Stolbikov et al.

(10) Patent No.: US 12,592,827 B2
(45) Date of Patent: Mar. 31, 2026

(54) PAIRING METHODS IN ZERO-TRUST NETWORKS

(71) Applicant: Lenovo (Singapore) Pte. Ltd., Singapore (SG)

(72) Inventors: Igor Stolbikov, Apex, NC (US); Sergei Rodionov, Plano, TX (US); Rod D Waltermann, Rougemont, NC (US); Scott Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 114 days.

(21) Appl. No.: 18/520,009

(22) Filed: Nov. 27, 2023

(65) Prior Publication Data
US 2025/0175341 A1      May 29, 2025

(51) Int. Cl.
| | |
|---|---|
| *H04L 9/32* | (2006.01) |
| *H04L 9/08* | (2006.01) |
| *H04L 9/30* | (2006.01) |
| *H04L 67/141* | (2022.01) |

(52) U.S. Cl.
CPC .......... *H04L 9/3226* (2013.01); *H04L 9/0819* (2013.01); *H04L 9/3066* (2013.01); *H04L 67/141* (2013.01)

(58) Field of Classification Search
CPC . H04L 63/1433; H04L 63/20; H04L 63/1441; H04L 63/102; H04L 63/08; H04L 63/10; H04L 2209/38; H04L 63/1416; H04L 2209/46; H04L 2209/805; H04L 41/046; H04L 41/0893; H04L 41/12; H04L 41/145; H04L 41/16; H04L 63/0853; H04L 63/104; H04L 63/1425; H04L 63/205; H04L 9/3226; G06F 2221/2101; G06F 21/552; G06F 21/554; G06F 21/56; G06F 21/566; G06F 2221/034; G06F 21/57; G06F 21/577; G06F 21/602; G06F 21/6209; G06F 21/6218; G06F 8/61; H04W 12/06; H04W 12/08; H04W 12/0027; H04W 12/00505; H04W 12/0609

USPC ........ 713/155, 150, 163, 181; 726/2, 21, 36; 380/255, 264, 276

See application file for complete search history.

(56) References Cited

U.S. PATENT DOCUMENTS

| | | | | |
|---|---|---|---|---|
| 8,010,085 B2 * | 8/2011 | Apte | ..................... | G06F 21/577 |
| | | | | 709/227 |
| 8,464,335 B1 * | 6/2013 | Sinha | ..................... | G06F 21/51 |
| | | | | 713/153 |
| 8,656,154 B1 * | 2/2014 | Kailash | ............... | H04L 63/0807 |
| | | | | 713/168 |
| 8,869,259 B1 * | 10/2014 | Udupa | .................... | H04L 63/20 |
| | | | | 726/10 |

(Continued)

*Primary Examiner* — Sharif E Ullah

(74) *Attorney, Agent, or Firm* — Schwegman Lundberg & Woessner, P.A.

(57)          ABSTRACT

A method for communications in a network can include performing a pairing between a first device and a second device in the network. The method can include deriving a port knocking sequence from identification information of the pairing. The method can include providing port knocking according to the port knocking sequence. The method can include authorizing a connection between the first device and the second device responsive to detecting the port knocking sequence. Other devices and methods are described.

16 Claims, 3 Drawing Sheets

(56)     References Cited

U.S. PATENT DOCUMENTS

| | | | | |
|---|---|---|---|---|
| 8,869,262 | B2 * | 10/2014 | Mullick | H04L 63/0876 |
| | | | | 709/227 |
| 8,955,091 | B2 * | 2/2015 | Kailash | H04L 63/1425 |
| | | | | 726/11 |
| 9,065,800 | B2 * | 6/2015 | Devarajan | G06F 21/56 |
| 9,100,424 | B1 * | 8/2015 | Thomas | H04L 67/1095 |
| 9,344,393 | B2 * | 5/2016 | Boynton | H04L 63/0272 |
| 9,531,758 | B2 * | 12/2016 | Devarajan | H04L 63/20 |
| 9,654,507 | B2 * | 5/2017 | Gangadharappa | H04L 63/20 |
| 9,882,767 | B1 * | 1/2018 | Foxhoven | H04L 61/4552 |
| 9,935,955 | B2 * | 4/2018 | Desai | H04L 67/02 |
| 10,044,719 | B2 * | 8/2018 | Desai | H04L 63/20 |
| 10,142,362 | B2 * | 11/2018 | Weith | H04L 63/20 |
| 2018/0109497 | A1 * | 4/2018 | Claes | H04L 63/166 |
| 2018/0241718 | A1 * | 8/2018 | Stair | H04L 63/108 |
| 2018/0309795 | A1 * | 10/2018 | Ithal | H04L 63/029 |
| 2021/0345080 | A1 * | 11/2021 | Uy | H04W 12/06 |

* cited by examiner

PAIRING METHODS IN ZERO-TRUST NETWORKS

TECHNICAL FIELD

Embodiments described herein generally relate to networking and computing, and in an embodiment, but not by way of limitation, to pairing in zero-trust networks.

BACKGROUND

Mesh networks are becoming increasingly common in a wide variety of applications. Network security is an important issue to consider when operating a mesh network. If sufficient security is not put into place, a mesh network can be disabled by broadcasting an insecure packet within the network, because the packet can propagate through most if not all of the devices. Cryptographic techniques can be applied to reduce security risks. However, some available techniques may be complicated to implement. Therefore, there is a general need for simple security techniques for mesh networks and, in general, zero-trust networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

A mesh network typically includes multiple electronic devices interconnected in a decentralized manner. Instead of using a centralized hub or switch, devices connect directly to other devices, forming a mesh-like structure. In a mesh network, devices route data to and from other devices in the network and to and from devices outside then network. Mesh networks are becoming more popular in applications including home security and home automation systems, home network systems, smart grid systems, and other "Internet-of-Things" (IoT) systems.

Figure 1:
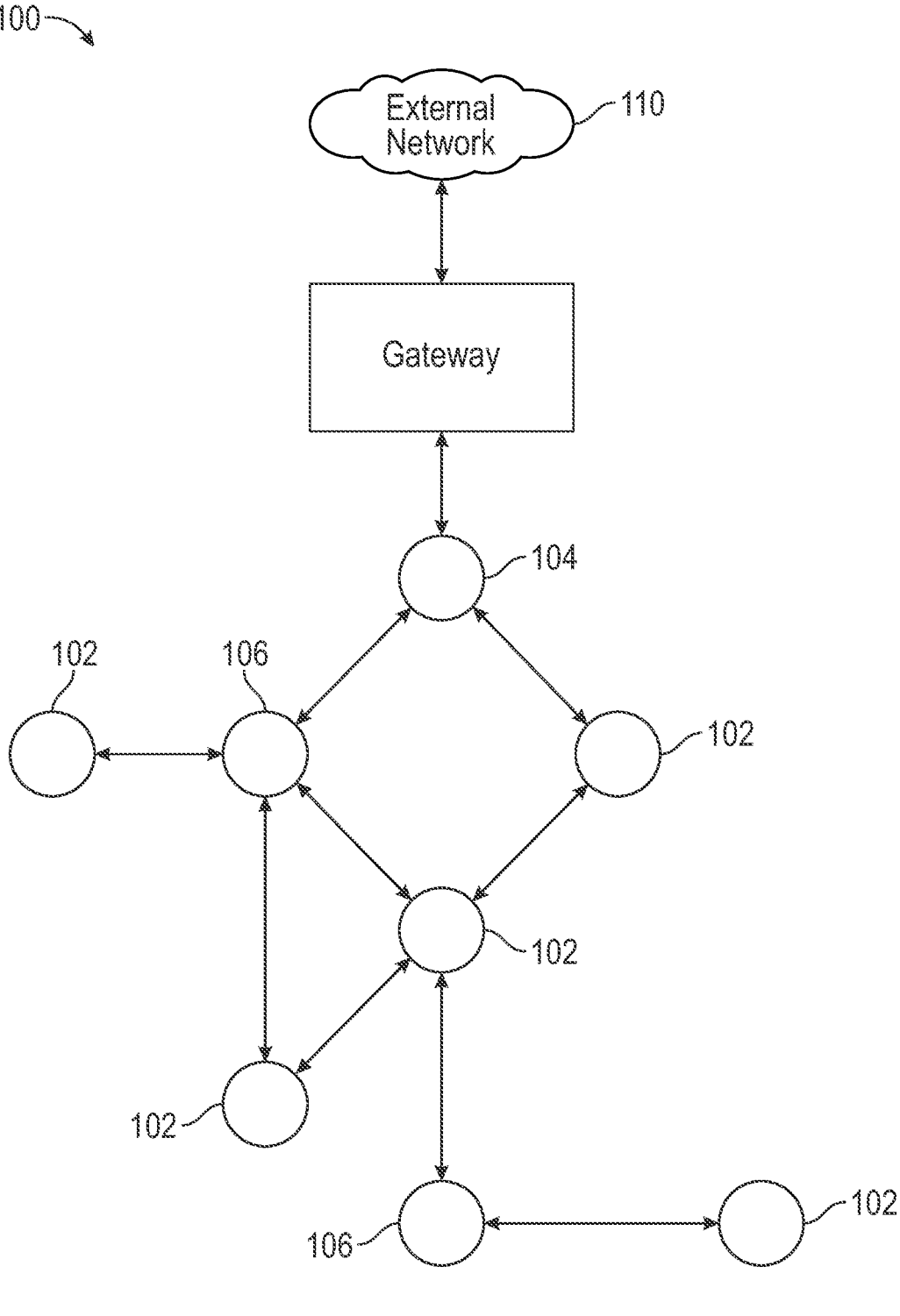
FIG. 1 illustrates a mesh network in which example embodiments can be implemented.

FIG. 1 illustrates a mesh network 100 in which example embodiments can be implemented. Mesh network 100 includes a plurality of electronic devices (referred to herein as "nodes") 102, which are organized in a mesh topology. Nodes 102 of mesh network 100 communicate with each other via zero, one, or more intermediate electronic devices or nodes. Nodes can communicate with one or more neighboring nodes. Neighboring nodes can be connected through a wired or wireless connection. Nodes can also communicate via intermediate nodes in a "one-hop" communication, "two-hop" communication, etc. The mesh network 100 can communicatively couple to external networks 110 outside mesh network 100. In some embodiments, mesh network 100 can couple to external network 110 via a gateway node 104.

Security can be an important consideration when configuring and operating the mesh network 100. Some mesh networks implement cryptographic techniques to encrypt and/or authenticate the messages transmitted between nodes within those networks. For example, mesh networks may be configured with asymmetric (public-key) or symmetric cryptosystems. However, cryptosystems can result in delays in message transmission and can delete battery power in some low-power nodes. Firewalls can help increase network security through the use of port and protocol filtering to minimize server access from arbitrary Internet Protocol (IP) addresses. However, firewalls can be scanned for vulnerabilities, resulting in reduced security.

Further security can be provided using "port knocking." "Port knocking" is a method of externally opening ports on a firewall by generating a connection attempt on a set of prespecified closed ports. Once a correct sequence of connection attempts is received the firewall allows the device that sent the connection attempts to connect over specified port/s. The port knock sequence comprises one or more Transmission Control Protocol (TCP) or User Datagram Protocol (UDP) packets to numbered ports on the host system. A knock can be relatively simple (e.g., an ordered list of ports) or can include time dependencies, encryption, etc. In addition to preventing access by devices that do not have the correct knocking sequence, port knocking can enhance firewall security by allowing authentication without data being returned over the ports. Therefore, listening or malicious devices cannot tell that there is a server listening on the ports protected by the knock server.

Port knocking has a couple downsides in that it is still possible to conduct replay attacks to masquerade as a authenticated device. Further, port knocking schemes use up some packet payload, thereby limiting the amount of data that can be transferred. Single packet authorization (SPA) is an application-level protocol that addresses some concerns with port knocking. The SPA data format is less vulnerable to replay attacks and increases the amount of data that can be sent in the data packets. However, the SPA protocol has some shortcomings in dynamic interconnected networks with public/private key identities.

The methods and apparatuses according to various embodiments address these and other concerns by providing dynamic port opening and authorization based on public/private key cryptography. The ports to be knocked are defined dynamically based on the elliptic curve (EC) group cryptographic identities of the linked devices (e.g., EC public keys) derived from the pairing process. Dynamic keys are derived from a key negation function using a password key exchange protocol (e.g., Password Authentication Key Exchange (PAKE)) based on the pairing secret used during pairing. During pairing, secret cryptographic keys are exchanged between devices to establish a relationship between the two devices. Alternatively, for devices that have already been paired, dynamic keys can be derived from an elliptic curve Diffie-Hellman Ephemeral (ECDHE) function with the established public/private key identity for the pairing. In the context of embodiments, dynamic keys can be understood to be one-time symmetric cryptographic keys.

A device according to embodiments can hash dynamic keys, device identities, application identities, device location, time and other attributes to generate a connectivity string (e.g., a pre-authorize connectivity string) and then cryptographically derive a port knocking sequence, authorization packages, etc. A receiving device can validate the knocking sequence against paired devices' identities and either authorize or refuse authorization to connections from the requesting device. Accordingly, the receiving device can validate data received from the transmissions can be validate by validating a knock sequence without having had prior exchanges.

Embodiments as described herein can therefore provide dynamic mesh networks that are resilient to external scans. Devices attempting to connect without matching the derived knock sequence can be regarded as malicious (and marked accordingly) and not authorized for connection.

Figure 2:
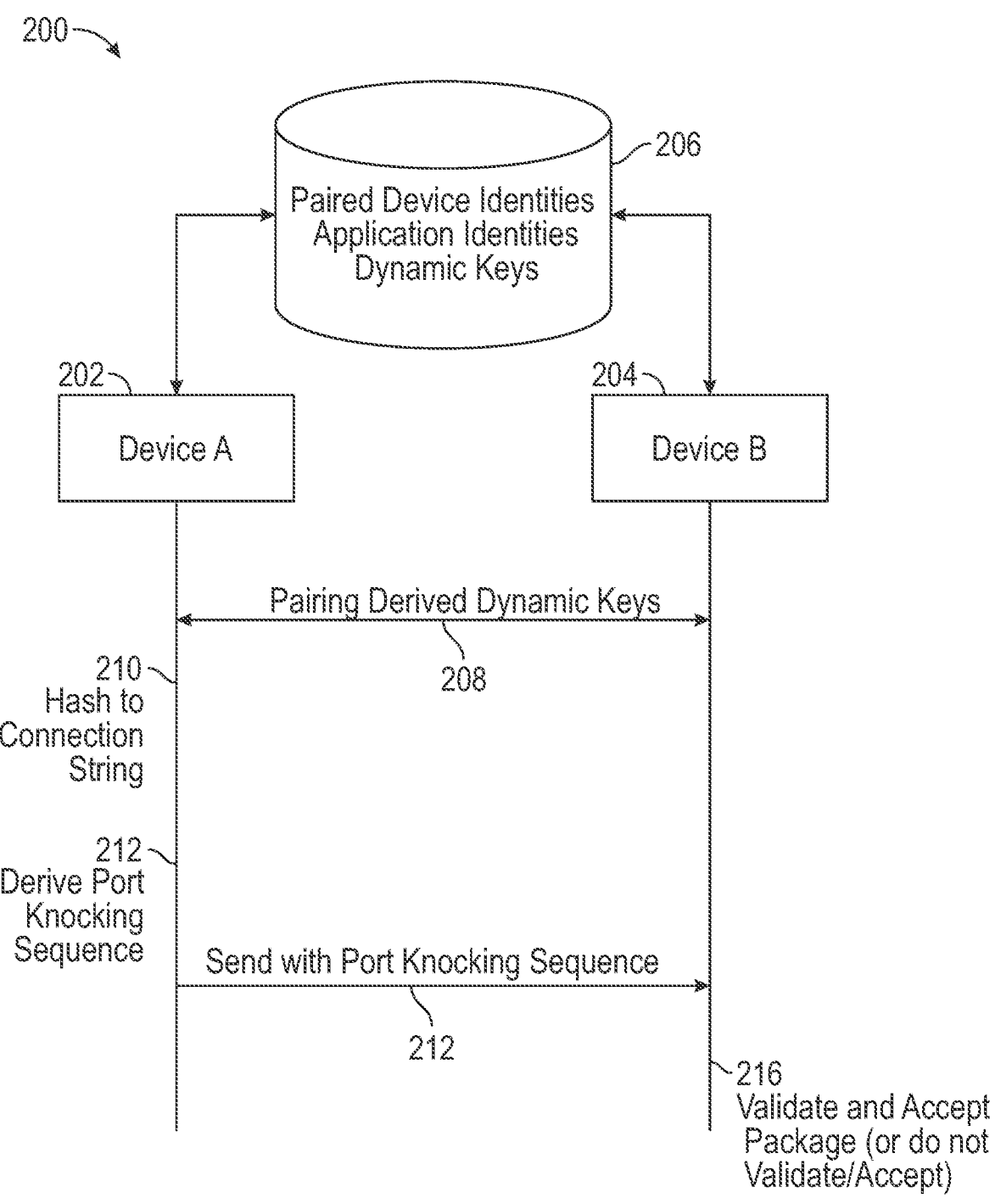
FIG. 2 illustrates a communication flow diagram according to example embodiments.

FIG. 2 illustrates a communication flow diagram 200 according to example embodiments. In embodiments, a device 202 and a device 204 can be part of a mesh network (such as that shown in FIG. 1). Data 206 may be available for accessing and storing device identities for paired devices or other data. Data 206 can be stored on the device/s 202, 204 or remotely within the cloud for example. After pairing 208, dynamic keys can be derived based on public keys derived from the pairing process. Dynamic keys can be derived from key negation functions using either PAKE or ECDHE as described above.

At operation 210 the connection string can be hashed. This can be based on data retrieved from data 206, for example dynamic keys, device identities application identities, etc. as well as attributes of the device 202, such as device location, time, and other attributes. At operation 212, a port knocking sequence can be derived based on cryptographic information such as certificates, public or private keys, etc. The port knocking sequence can be stored in data 206 such that the port knocking sequence is associated with at least the device 202. An example port knocking sequence can specify port numbers in the order that those ports should be knocked. For example, given 32768 possible ports, the port knocking sequence can specify that port 23401, port 1002, port 2007, and port 32765 should be knocked in that order. Any number of ports can be available, and embodiments are no limited to 32768 ports. Furthermore, sequences can include any number of port definitions. The number of sequences and the number of ports can be derived during execution or can be based on the security needs and latency needs of the mesh network operations.

In some examples a time spacing may be specified between one or more knocks. In some methods, devices can specify that the sequence should be repeated one or more times, with timing defined between these repetitions.

When device 202 is ready to transmit data to device 204, the device 202 provides the knocking sequence at 214 by knocking on the ports specified in the specified order with specific timing. Knocking can be done by providing a data packet (e.g., TCP SYN packet) to the specified ports in order. If device 204 recognizes the knocking sequence as valid (e.g., associated with a paired device) the device 204 will accept the data packet/s without further validation being necessary. Otherwise, the message is rejected and the device 202 is assumed to be malicious or a participant in a distributed denial-of-service (DDoS) attack.

Figure 3:
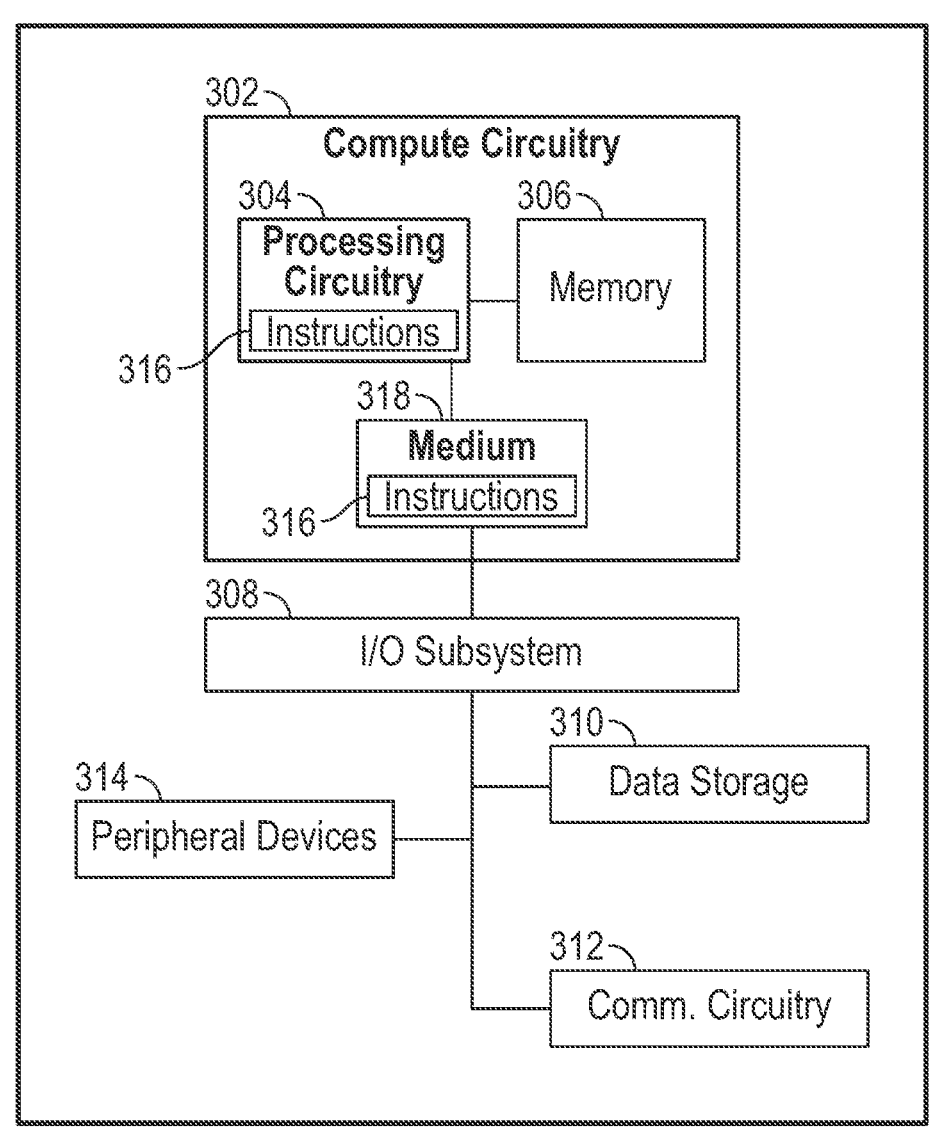
FIG. 3 illustrates a device according to some embodiments.

FIG. 3 illustrates a device 300 according to some embodiments. The device 300 can serve as a node in FIG. 1 or as one of the devices 202, 204 of FIG. 2.

The device 300 can include any type of device, appliance, computer, or other "thing" capable of communicating with other edge, networking, or endpoint components in any network and in particular in a mesh network or zero-trust network. For example, the device 300 may be embodied as a personal computer, server, smartphone, a mobile compute device, a smart appliance, an in-vehicle compute system (e.g., a navigation system), a self-contained device having an outer case, shell, etc., or other device or system capable of performing the described functions.

The device 300 includes a compute engine (also referred to herein as "compute circuitry") 302, an input/output (I/O) subsystem 308, data storage 310, communication circuitry 312, and, optionally, one or more peripheral devices 314. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The device 300 may be embodied as any type of engine, device, or collection of devices capable of performing various compute functions. In some examples, the device 300 may be embodied as a single device such as an integrated circuit, an embedded system, a field-programmable gate array (FPGA), a system-on-a-chip (SOC), or other integrated system or device. In the illustrative example, the device 300 includes processing circuitry 304 and a memory 306. The processing circuitry 304 may be embodied as any type of processor capable of performing the functions described herein (e.g., executing an application). For example, the processing circuitry 304 may be embodied as a multi-core processor(s), a microcontroller, or other processor or processing/controlling circuit. In some examples, the processing circuitry 304 may be embodied as, include, or be coupled to an FPGA, an application specific integrated circuit (ASIC), reconfigurable hardware or hardware circuitry, or other specialized hardware to facilitate performance of the functions described herein.

The processing circuitry 304 can provide a cryptographic identity over the communication circuitry 312 to pair with a second device according to methods described herein with respect to FIG. 2.

The processing circuitry 304 can derive a port knocking sequence from identification information of the pairing. Identification information can include dynamic cryptographic identities (e.g., dynamic keys), and the dynamic keys can be derived during pairing using a key negation function based on PAKE or ECDHE protocols (by way of example).

The processing circuitry 304 can encode signals for port knocking according to the port knocking sequence in a subsequent communication on a network (e.g., mesh network, zero-trust network, or other network), and transmit the signals using the communication circuitry 312. The processing circuitry 304 can also detect port knocking coming from other devices on the network, and decide whether to authorize connections, data, etc. coming from the other devices based on whether the received port knocking matches expected port knocking (based on criteria described above with reference to FIG. 2).

The processing circuitry 304 can include instructions 316. The instructions 316 on the processor 304 (separately, or in combination with the instructions 316 of the machine-readable medium 318) may perform pairing of devices in a network as described above. The instructions can derive port knocking sequences, and encode a signal to provide port knocking according to the prescribed port knocking sequence. In an example, the instructions 316 provided via the memory 306 or the processor 304 may be embodied as a non-transitory, machine-readable medium including code to direct the processor 304 to perform electronic operations in a computing device. The processor 304 may access the non-transitory, machine-readable medium 318 over an interconnect. For instance, the non-transitory, machine-readable medium 318 may be embodied by devices described for the storage 310 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 318 may include instructions 316 to direct the processor 304 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media The memory 306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium.

The compute circuitry 302 is communicatively coupled to other components of the device 300 via the I/O subsystem 308, which may be embodied as circuitry and/or components to facilitate input/output operations with the compute circuitry 302 (e.g., with the processing circuitry 302 and/or the main memory 306) and other components of the compute circuitry 302. For example, the I/O subsystem 308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations.

The one or more illustrative data storage devices 310 may be embodied as any type of devices configured for short-term or long-term storage of data such as, for example, memory devices and circuits, memory cards, hard disk drives, solid-state drives, or other data storage devices.

The communication circuitry 312 may be embodied as any communication circuit, device, or collection thereof, capable of enabling communications over a network between the compute circuitry 302 and another compute device (e.g., an edge gateway of an implementing edge computing system or any device that can communicate on a mesh network or a zero-trust network). The communication circuitry 312 may be configured to use any one or more communication technology (e.g., wired or wireless communications) and associated protocols (e.g., Ethernet etc.) to effect such communication.

Additionally, in some examples, a respective device 300 may include one or more peripheral devices 314. Such peripheral devices 314 may include any type of peripheral device found in a compute device or server such as audio input devices, a display, other input/output devices, interface devices, and/or other peripheral devices, depending on the particular type of the device 300.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

We claim:

1. A method performed for communications in a network, the method comprising:

performing a pairing between a first device and a second device in the network;

deriving, during the pairing, a dynamic cryptographic identity for at least one of the first device and the second device using a key-negation function based on a Password-Authentication Key Exchange (PAKE) protocol;

deriving a port knocking sequence from the dynamic cryptographic identity identification information of the pairing;

providing port knocking according to the port knocking sequence; and authorizing a connection between the first device and the second device responsive to detecting the port knocking sequence;

detecting a connection attempt from a third device that does not include the port knocking sequence;

marking the connection attempt as a malicious attempt responsive to the detection; and refraining from transmitting the signals to the third device;

wherein the port knocking sequence specifies port numbers in an order that the port numbers should be knocked.

2. The method of claim 1, further comprising:

deriving the dynamic cryptographic identity subsequent to pairing based on an elliptic curve Diffie-Hellman Ephemeral (ECDHE) protocol.

3. The method of claim 1, further comprising:

detecting a connection attempt that does not include the port knocking sequence; and marking the connection attempt as a malicious attempt responsive to the detecting.

4. The method of claim 1, further comprising:

hashing a device identity of the first device or the second device to a pre-authorize connectivity string prior to deriving the port knocking sequence.

5. The method of claim 4, further comprising:

hashing an application identity or a device location to the connectivity string prior to deriving the port knocking sequence.

6. A device comprising:

communication circuitry; and processing circuitry coupled to the communication circuitry and configured to:

provide a cryptographic identity over the communication circuitry to pair with a second device;

derive, during the pairing, a dynamic cryptographic identity for at least one of the first device and the second device using a key-negation function based on a Password-Authentication Key Exchange (PAKE) protocol;

derive a port knocking sequence from the dynamic cryptographic identity identification information of the pairing;

encode signals for port knocking according to the port knocking sequence in a subsequent communication with the second device; and transmit the signals using the communication circuitry;

detect a connection attempt from a third device that does not include the port knocking sequence;

mark the connection attempt as a malicious attempt responsive to the detection; and refrain from transmitting the signals to the third device;

wherein the port knocking sequence specifies port numbers in an order that the port numbers should be knocked.

7. The device of claim 6, wherein the processing circuitry is further configured to:

authorize a connection to the second device responsive to detecting the port knocking sequence in a communication from the second device.

8. The device of claim 6, wherein the identification information includes a dynamic cryptographic identity of the device.

9. The device of claim 8, wherein the processing circuitry is further configured to:

derive the dynamic cryptographic identity during the pairing using a key negation function based on a Password Authentication Key Exchange (PAKE) protocol.

10. The device of claim 9, wherein the processing circuitry is further configured to:

derive the cryptographic identity subsequent to pairing based on an elliptic curve Diffie-Hellman Ephemeral (ECDHE) protocol.

11. The device of claim 6, wherein the processing circuitry is further configured to:

hash a device identity of the device to a pre-authorize connectivity string prior to deriving the port knocking sequence.

12. The device of claim 11, wherein the processing circuitry is further configured to:

hash an application identity or a device location to the connectivity string prior to deriving the port knocking sequence.

13. A non-transitory machine-readable medium including instructions that, when executed on processing circuitry, cause the processing circuitry to perform operations including:

performing a pairing between a first device and a second device in a network;

deriving, during the pairing, a dynamic cryptographic identity for at least one of the first device and the second device using a key-negation function based on a Password-Authentication Key Exchange (PAKE) protocol;

derive a port knocking sequence from the dynamic cryptographic identity identification information of the pairing;

encoding a signal to provide port knocking according to the port knocking sequence; and authorizing a connection between the first device and the second device responsive to detecting the port knocking sequence;

detecting a connection attempt from a third device that does not include the port knocking sequence;

marking the connection attempt as a malicious attempt responsive to the detecting; and refraining from transmitting the signals to the third device;

wherein the port knocking sequence specifies port numbers in an order that the port numbers should be knocked.

14. The non-transitory machine-readable medium of claim 13, wherein the identification information includes a dynamic cryptographic identity of at least one of the first device and the second device.

15. The non-transitory machine-readable medium of claim 14, wherein the operations further comprise:

prior to pairing, deriving the dynamic cryptographic identity using a key negation function based on a Password Authentication Key Exchange (PAKE) protocol; and subsequent to pairing, deriving the cryptographic identity subsequent to pairing based on an elliptic curve Diffie-Hellman (ECDH) protocol.

16. The non-transitory machine-readable medium of claim 13, wherein the operations further comprise:

hashing at least one of a device identity, an application identity, or a device location to a pre-authorize connectivity string prior to deriving the port knocking sequence.

* * * * *